United States Patent
McDonald, Jr.

(10) Patent No.: US 8,069,206 B2
(45) Date of Patent: Nov. 29, 2011

(54) SYSTEM AND METHOD FOR REAL-TIME FEEDBACK WITH CONSERVATIVE NETWORK USAGE IN A TELECONFERENCING SYSTEM

(75) Inventor: Rex E. McDonald, Jr., Layton, UT (US)

(73) Assignee: Clearone Communications, Inc., Salt Lake City, UT (US)

( * ) Notice: Subject to any disclaimer, the term of this patent is extended or adjusted under 35 U.S.C. 154(b) by 1052 days.

(21) Appl. No.: 11/083,827

(22) Filed: Mar. 18, 2005

(65) Prior Publication Data

US 2006/0230106 A1    Oct. 12, 2006

(51) Int. Cl.
- *G06F 15/16* (2006.01)
- *H04M 3/42* (2006.01)
- *H04N 7/14* (2006.01)
- *H04N 5/232* (2006.01)

(52) U.S. Cl. ............... 709/204; 455/416; 348/14.08; 348/14.09; 348/211.12

(58) Field of Classification Search ............... 709/204; 455/416; 348/14.08, 14.09, 211.12
See application file for complete search history.

(56) References Cited

U.S. PATENT DOCUMENTS

| | | | | |
|---|---|---|---|---|
| 4,516,156 A * | 5/1985 | Fabris et al. | 348/14.1 |
| 5,490,247 A * | 2/1996 | Tung et al. | 345/501 |
| 5,506,954 A * | 4/1996 | Arshi et al. | 345/501 |
| 5,585,839 A * | 12/1996 | Ishida et al. | 348/14.09 |
| 5,594,859 A * | 1/1997 | Palmer et al. | 15/756 |
| 5,619,555 A * | 4/1997 | Fenton et al. | 379/88.11 |
| 5,790,177 A * | 8/1998 | Kassatly | 725/87 |
| 5,802,294 A * | 9/1998 | Ludwig et al. | 709/204 |
| 6,151,621 A * | 11/2000 | Colyer et al. | 709/204 |
| 6,288,739 B1 * | 9/2001 | Hales et al. | 348/14.07 |
| 6,418,472 B1 * | 7/2002 | Mi et al. | 709/229 |
| 6,496,201 B1 * | 12/2002 | Baldwin et al. | 715/753 |
| 6,760,750 B1 * | 7/2004 | Boneh et al. | 709/204 |
| 7,155,480 B2 * | 12/2006 | Byrisetty et al. | 709/204 |
| 7,280,650 B2 * | 10/2007 | Miao | 379/202.01 |
| 7,296,023 B2 * | 11/2007 | Geyer et al. | 1/1 |
| 2001/0009014 A1 * | 7/2001 | Savage et al. | 709/204 |
| 2002/0076025 A1 * | 6/2002 | Liversidge et al. | 379/202.01 |
| 2002/0174171 A1 * | 11/2002 | Byrisetty et al. | 709/203 |
| 2003/0118067 A1 * | 6/2003 | Johnson | 372/45 |
| 2003/0118167 A1 * | 6/2003 | Sammon et al. | 379/202.01 |
| 2004/0146031 A1 * | 7/2004 | Jukarainen | 370/337 |
| 2004/0199580 A1 * | 10/2004 | Zhakov et al. | 709/204 |
| 2005/0206721 A1 * | 9/2005 | Bushmitch et al. | 348/14.09 |
| 2005/0213731 A1 * | 9/2005 | Rodman et al. | 379/202.01 |
| 2005/0276234 A1 * | 12/2005 | Feng et al. | 370/260 |

* cited by examiner

*Primary Examiner* — Jeffrey Pwu
*Assistant Examiner* — Guang Li
(74) *Attorney, Agent, or Firm* — Matthew J. Booth & Associates, PLLC; Matthew J. Booth

(57) ABSTRACT

Disclosed herein are teleconferencing devices having remote access monitoring and control functions, and network systems and methods including and using the same. Also disclosed herein are methods for interacting with teleconferencing devices over an HTTP or other network service utilizing a persistent network connection and systems which implement the methods. Also disclosed are systems that permit clients to select which types of information to be updated in real-time to conserve bandwidth. Detailed information on various example embodiments of the inventions are provided in the Detailed Description below, and the inventions are defined by the appended claims.

15 Claims, 7 Drawing Sheets

FIG. 4A
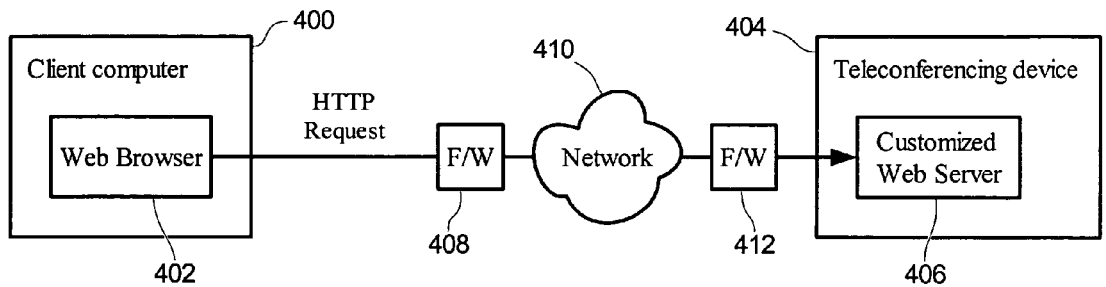
FIG. 4B
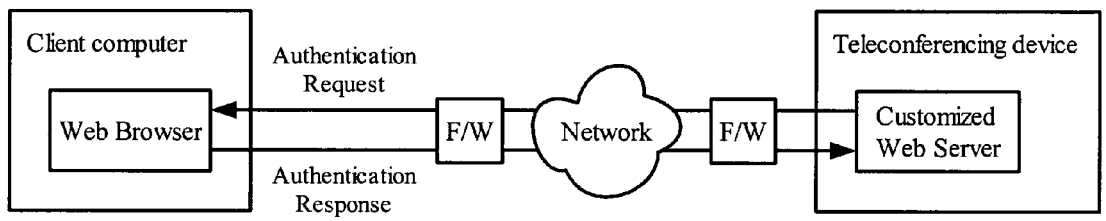
FIG. 4C
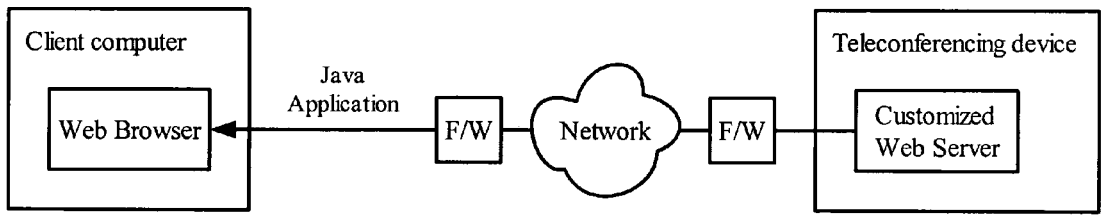
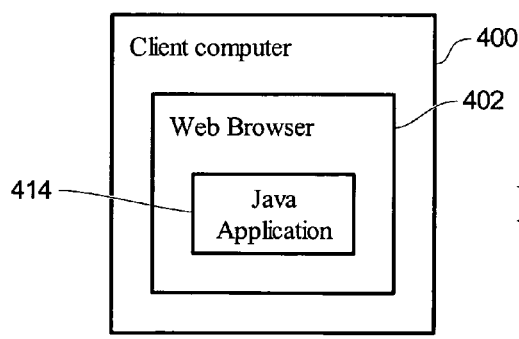
FIG. 4D

SYSTEM AND METHOD FOR REAL-TIME FEEDBACK WITH CONSERVATIVE NETWORK USAGE IN A TELECONFERENCING SYSTEM

BACKGROUND

The claimed systems and methods relate generally to control and monitoring of teleconferencing devices over a network, and more particularly to teleconferencing systems that provide a network service connectable by clients to monitor teleconference states in real-time and provide a client executable object that can select informational types provided by the network service.

Teleconferencing systems in the past have typically included a teleconferencing device controlling various audio input and output devices, and have normally included a local console for control of the device and teleconferences. As time has passed, it has become desirable to hide the electronics from the conferees, presenting only input and output devices such as speakers and microphones. Additionally, some conferees do not wish to operate or to be trained in the operation of a teleconferencing device, and would prefer that a technician control and/or monitor conferences. It has been desired to locate the technician away from the area of the conference, which requires a remote connection to the teleconferencing device and/or equipment.

BRIEF SUMMARY

Disclosed herein are teleconferencing devices having remote access monitoring and control functions, and network systems and methods including and using the same. Detailed information on various example embodiments of the inventions are provided in the Detailed Description below, and the inventions are defined by the appended claims.

BRIEF DESCRIPTION OF THE DRAWINGS

FIGS. 4A-4J show a network-conservative real-time method of communication between a client computer and a teleconferencing device.

Reference will now be made in detail to electronic conferencing systems incorporating pods which may include various aspects, examples of which are illustrated in the accompanying drawings.

DETAILED DESCRIPTION

Methods useful for providing control and monitoring of teleconferencing systems are described below. In conjunction with that description, several reference teleconferencing systems are now described.

Figure 1:
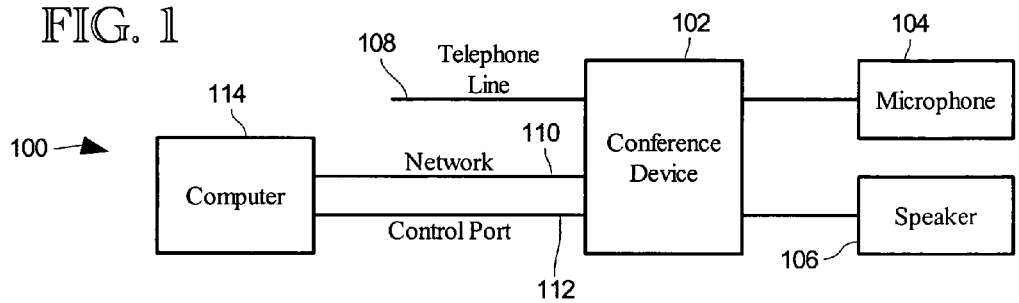
FIG. 1 shows elements of a simple teleconferencing system.

Referring first to FIG. 1, a simple teleconferencing system 100 is described having a facility for control and/or monitoring through network access. A conference device 102 is supplied being connectable to a microphone 104 and a speaker 106, thereby permitting audible interaction with conference participants. Conference device 102 is further connectable to a telephone line 108, whereby device 102 may transmit and receive audio signals from a remote telephonic device, which might be a telephone, a conferencing device or the like. Conference device 102 is further connectable and controllable by a computer device 114, which might for example be a personal computer, terminal, embedded device or any other communicative device connectable to device 102. In the example of FIG. 1, a control port 112 is provided for configuring, monitoring and/or controlling conference device 102. Port 112 might be, for example, an RS-232, serial or USB communications port. Communication using control port 112 may rely on a protocol adapted specially for a particular type of conference device, or a standard protocol might be used operable across a range of conference device types. In one example, control port 112 utilizes a protocol that uses ordinary textual characters, permitting computing device 114 to be a terminal or a terminal window.

A network connection 110 may also be provided, whereby computing device 114 may be connected to conference device 102 and communicate thereby. Network connection 110 may permit communication over a standard protocol and medium, for example Ethernet over 100BaseT. Likewise, TCP/IP protocols maybe used. In one example, conference system provides an HTTP service over network connection 110, which a user operating computer 114 may access by an ordinary web browser. If a network connection 110 is provided, conference device 102 may be configured to omit a control port 112, if device 102 utilizes a default address or other network configuration for first communication with computer 114.

Figure 2:
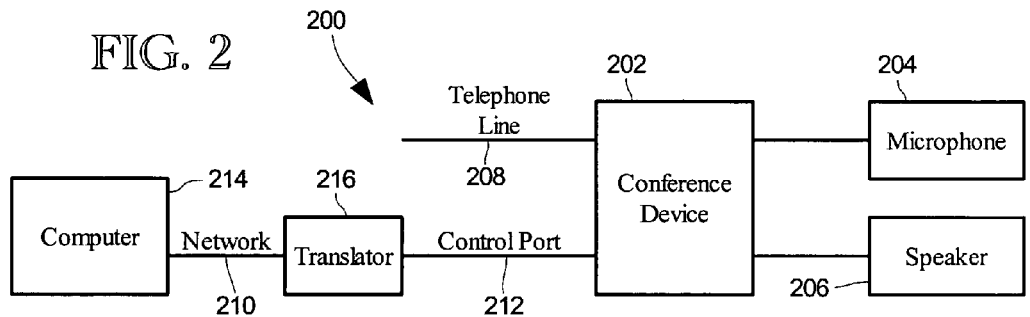
FIG. 2 shows elements of a simple teleconferencing system including a translating device for a conference system without network capabilities.

A teleconferencing device without network capabilities may also be made network accessible. Depicted in FIG. 2 are elements of such a teleconferencing system. As in the system of FIG. 1, teleconferencing system 200 includes a conference device 202, microphone 204, speaker 206 and a telephone line 208. In this system, however, a translator 216 is provided externally to conference 202 to provide network access functions. In the example of FIG. 2, translator 216 provides a network connection 210 and an HTTP server, whereby a user operating a computer 214 may reference state stored to translator 216 or conference device 202 and/or command the operation of conference device 202.

Translator 216 utilizes a control port 212 of conference device 202 to obtain state to report to computer 214, and also control conference system 202 in accordance with commands received over network connection 210. Translator 216 is configured specifically to utilize a protocol defined for control port 212, and translate information to and from conference system thereby. For example, conference device 202 may have a speaker volume setting, readable and settable through control port commands. At periodic times, or as desired, translator 216 may read the volume setting of conference device 202 and maintain that as local state. Commands may be received from a user by network connection 210 to set the volume of the attached conference device 202. Translator 216 receives user commands to set the volume of conference device 202. These commands might take many different forms, for example URLs, button identifiers or clicks in combination with cursor positions relative to a window. Translator 216 converts the user commands to control port commands and issues these to the control port 212. Alternatively, translator 216 might maintain no state, but rather package state information for computer 214 from reads executed at the time the state is needed. In that case, the protocol of control port 212 should be designed to be fast enough so as not to cause an undesirable delay.

Figure 3:
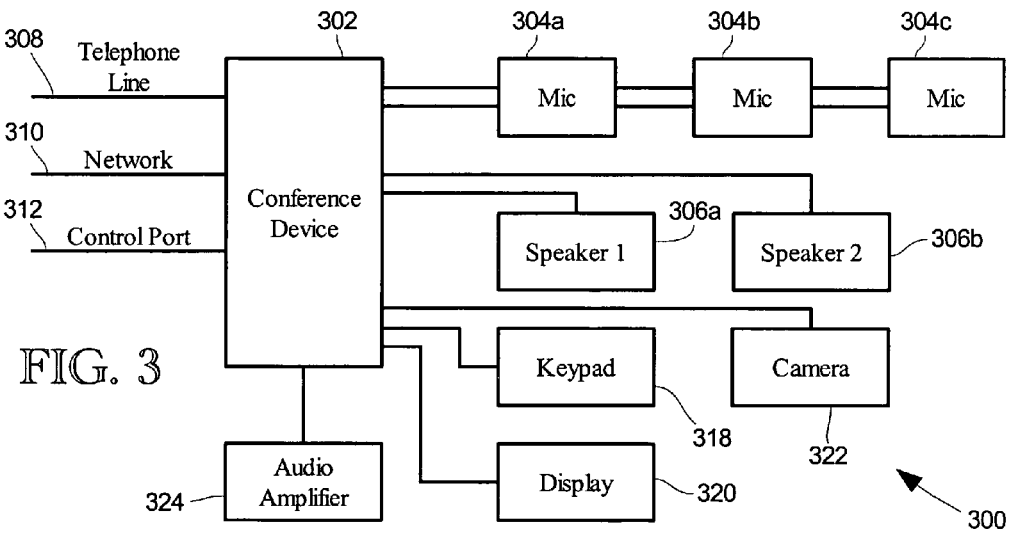
FIG. 3 shows a simple teleconferencing system with a more extensive array of auxiliary devices.

FIG. 3 depicts a conferencing system 300 with a more extensive array of auxiliary devices. In that example, conference device 302 is configured a chain of serially connected microphones 304*a*, 304*b* and 304*c*. Microphones 304*a* and 304*b* are configured to sum the signals from the microphone with the signal from any upstream microphones such that sound from all microphones can be received simultaneously. The configuration shown in FIG. 3 is merely exemplary, and other microphone configurations may be used, for example a parallel configuration or a configuration permitting only one microphone to be on at any given time. Several speakers may be attached to conference device 302, in this example 306*a* and 306*b*. The sound produced may be monaural, stereo or polyphonic, as desired, and the speakers may be positioned around a room to achieve listenability or other desired audio characteristics.

Conference device 302 further includes a keypad 318 for local user input and a local display 320, which might be in one example an LCD display. A telephone line connection 308 is connectable to a standard telephone wire pair, providing transmission of local signals and reception of signals from remote telephonic equipment. A control port 312 is optionally provided to control, monitor and/or configure device 302. A network connection 310 provides access to network clients as described above. The example of FIG. 3 further includes a camera for receiving local images of conference participants, and conference device 302 includes facilities for transmitting those image to remote conferees through network connection 310 or otherwise. Provision is made for connection of an audio amplifier 324, permitting other types of audio-producing or recording equipment to be used.

Now in the examples described above, a telephone line connection maybe replaced with many other channel types. In one example, a conference device may establish a Voice Over IP (VOIP) connection, and the telephone line connection becomes a virtual connection over a connected network. In another example, a PBX connection may be used. In another example, a radio or satellite link might be used. Many other communications channels may be used, therefore, to meet the needs of a particular customer or application as desired. Likewise, the examples above may be varied in other ways without departing from the inventive concepts.

Also in the examples shown above, a connection is shown with a single network computer or client. A conference system may be adapted to service several network clients. In that case, it may be desirable to provide for state updates to passive clients for changes made to conferences in progress (or at other times), as will become apparent from the discussion below.

In the examples described above, a conferencing system may provide state to a client, which may occur, for example, through an HTTP request. A conference system may then respond with information reflecting the state existing at the time of the request. The usual operation of a web browser produces a single response, requiring a further request initiated by the user to maintain a current system view. As a conference system is used, users may desire to change various settings on the system, for example speaker volume or a mute function. It therefore becomes desirable to provide a way to update information presented to a user so as to give a continuing and current view of a teleconferencing system.

In one method described in U.S. Pat. No. 6,760,750, a Microsoft Component Object Model ("COM") technique is used to communicate data relating to a conference between a web server and a teleconference system. The web server must be capable of supporting an interface over COM, which indicates that a Microsoft web server, such as IIS, and a Microsoft browser, such as Internet Explorer, must be used. The disclosed system is accessible by a browser using the HTTP protocol, which access causes an ASP page with a server script to execute. The server script returns to the client browser a client script configured to receive periodic updates to a browser window. The server script runs in a periodic loop providing updated pages to the client script as the status of the teleconference system changes. The method described appears to maintain a single screen for all functions, and does not appear to permit a set of information types to be selected for several screens.

Figure 4E:
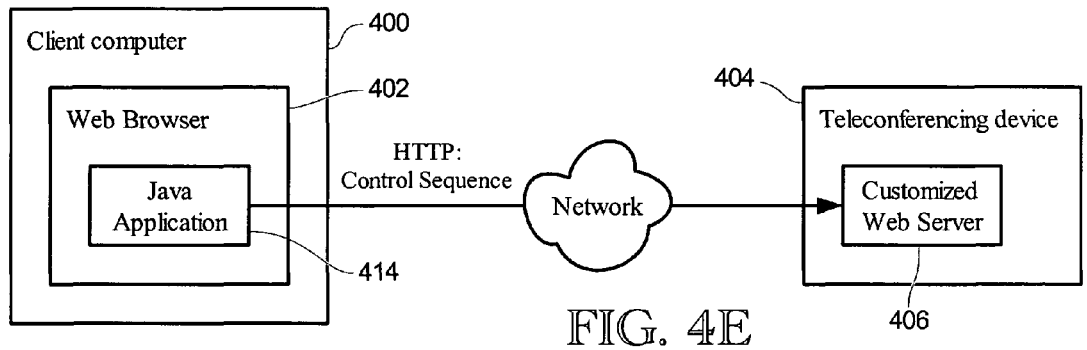

A network-conservative method will now be described, in relation to FIGS. 4A through 4J and FIG. 5, for monitoring and optionally controlling a teleconferencing system in real-time. Referring first to FIG. 4A, a network system for remotely controlling a teleconferencing device is illustrated. A teleconferencing device 404 includes network facilities for providing network communication over network 410 to network clients, for example client computer 400. Teleconferencing device 404 includes at least one audio input device, for example a microphone, and at least one audio output device, for example a speaker. Teleconferencing device 404 further includes facilities for connecting to a bi-directional audio channel for communications with other conferees, which channel might be a standard telephone line, a VOIP link, a full or half-duplex radio link, or any other channel capable of providing a conference to conferees. A teleconferencing device may support conferencing at more than one remote location, or over several audio channels; the discussion herein refers to the more frequently used conference type having two locations, one local and one remote, and two unidirectional channels for simplicity. The systems, methods and concepts herein may be extended further as will be understood by one of ordinary skill. Teleconferencing device 404 may be of the forms described for systems shown in FIGS. 1, 2 and 3, or devices modified thereof.

Teleconferencing device 404 is configured to operate a network service, in this instance by a web server 406 accepting HTTP requests at IP port 80. Web server 406 is a custom server, as will be described presently. Now although a web server 406 is used in this example, any network service may be utilized selected as appropriate for a given network type, protocol, arrangement or other factors of use. In the exemplary teleconferencing device 404 includes a processor executing instructions for operating network service 406 and for accessing teleconference data and functions of teleconferencing device 404. Teleconferencing device 404 further includes at least one storage device for storing the instructions and other programs or data as desired. The storage might be a hard disk, solid state memory such as flash memory, or any other data store accessible by the processor.

The exemplary client computer includes a web browser 402 operable to access network service 406, as will be described below. Also shown in the example of FIGS. 4A through 4J are firewalls 408 and 412, which provide protection from intrusive attacks from network 410.

Shown in FIG. 4A is the first communication in the system originated at the client computer 400 by a user directing web browser to make an HTTP request to the network address or location of web server 406. As most firewalls are configured to pass HTTP requests through, present firewalls 408 and 412 do not likely by default impede the initial HTTP request. Alternatively, an HTTPS request may be used, if web server 406 is appropriately configured. Additionally, an authentication step may optionally be performed to verify a user is authorized to access teleconferencing device 404, as shown in step 4B. That step includes a communication originated at device 404, requesting for example a name and a password. Other authentication types might use public key techniques, certificates, challenges or other objects. A response to the authentication step is returned from the client 400 to device 404.

In the example, client computer does not initially contain a program configured to access teleconferencing functions. Conveniently, a client computer may be used that supports common network functionality. In this example, client computer includes a web browser and a Java interpreter. Referring now to FIG. 4C, web server 406 delivers to the web browser 402 of client 400 a Java application configured to access teleconferencing functions available at teleconferencing device 404 through the network service 406. The requirement in the example of a Java interpreter in client computer 400 permits execution of the Java application using a wide variety of browsers and platforms. Other platform independent interpreters may be used, if desired, providing access to teleconferencing device from various computer types. Any client executable object delivered by web server 406 should be appropriately configured to execute on a particular client computer 406, meeting any requirements determined by the client platform types used or desired to be used. Client executable objects may also be platform dependent, and likewise a web server may detect a client platform type and conform the delivery of those objects to ensure proper operation.

Now referring to the example as shown in the state of FIG. 4D, the delivered Java application 414 is received and started by browser 402. Java application 414 may conveniently be configured to present a user interface within the web browser 402. Alternatively, Java application 414 may operate independently in a new process or thread or in it's own window on the client computer 400.

FIG. 4E depicts the first network action of Java application 414, which takes the form of a new request to network service 406, which in this example is an HTTP request with a particular form containing a control sequence recognizable by web server 406 as a request to connect to a teleconferencing service. The use of an HTTP request permits the request to pass through any firewalls, which are not shown for remaining FIGS. 4E through 4J. In making the initial request, the client executable object 414 opens a connection to network service 406, which might is a TCP/IP connection over port 80 in the example. Java application and web server 406 may maintain this connection open, so as to avoid any overhead associated with the creation and destruction of other connections therebetween.

Figure 4F:
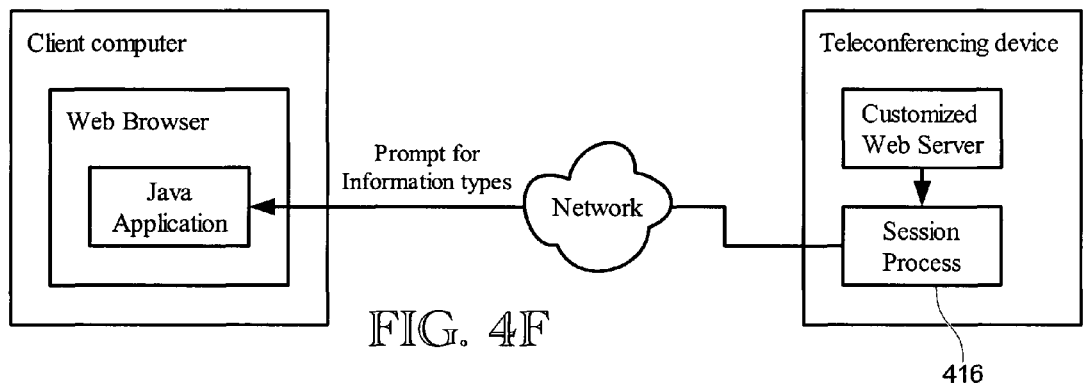

To avoid opening a new port, and to permit continued traversal through network firewalls, the exemplary system of FIG. 4F maintains the connection of the original HTTP request. A web server typically operates in a request/response mode, meaning that connections are maintained up until the time a response to a request is sent. For example, if a user at a web browser types a URL or clicks on a hyperlink, the browser resolves the name and issues an HTTP request to the corresponding location. The server receiving the request sends in response a web page or other object, and having no further action to take, closes the connection to the browser. In an exception to this operation, some web servers permit multiple requests to be transacted over a single connection, which is an optimization technique to reduce the number of connections or processes on that server, improving performance of the web server generally. Even so, that model entertains the prolonging of connections only for short periods until a group of transactions are complete, for example the contents of a web page incorporating a series of images and frames.

Web server 406 is customized to recognize the control sequence of the HTTP request sent by the client executable object 414, and rather than immediately sending a response and closing the connection, server 406 operates in a different fashion. In the example of FIG. 4F, web server starts a new session process 416 to maintain the open connection and interact with the client executable object 414. Web server 406, after spawning session process 416, may return to normal HTTP operation. The creation of a customized web server may be performed by modifying the source code of and rebuilding a stock server or embedded server application. In many platforms, the passing of a connection may entail passing a handle structure, which may require that session process 416 be spawned from a parent process having a valid handle structure. Otherwise, a session process might be a simple CGI script or other executable object apart from the web server, provided that a way is provided to pass the reference the original connection to the new session process.

After initialization, a number of activities may occur between the client executable object 414 and the session process 416. In the example of FIG. 4F, the client executable object 414 is prompted for information types to monitor in "real-time". Client executable object 414 may return a set of information types from those available on the teleconferencing system. For example, teleconferencing system may have state variable tracking the volume level of the audio received from microphones. Client executable object 414 may include a display object for indicating that volume level to the user, and may request that information type from teleconferencing device 404 through session process 416. Client executable object 414 may implement several user views, each of which may contain a different set of display objects and corresponding information types. Client executable object 414 and session process 416 may function to reconfigure the set of information types while maintaining the open connection.

Figure 4G:
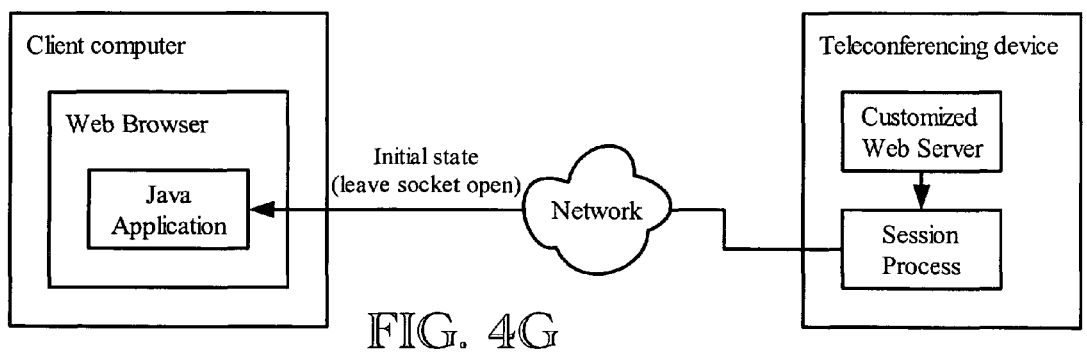
Figure 4H:
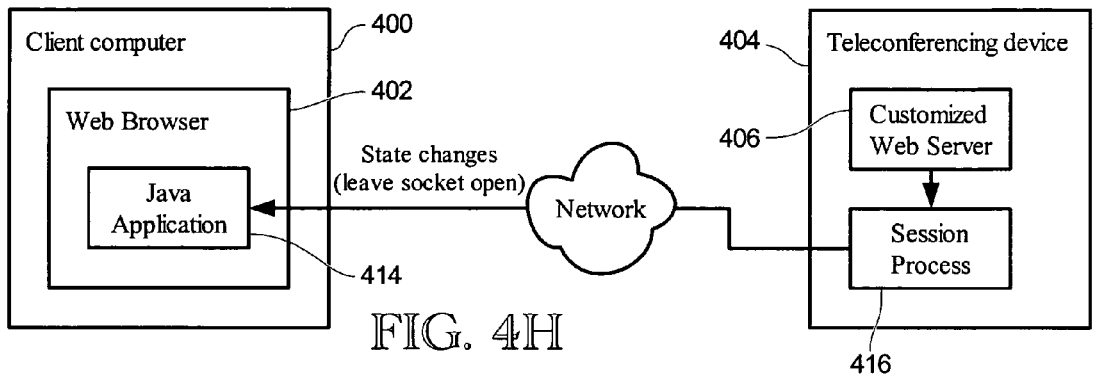
Figure 4I:
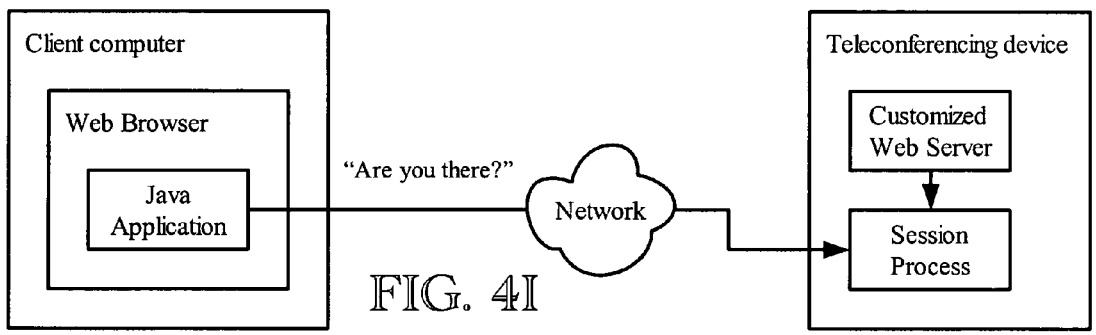
Figure 4J:
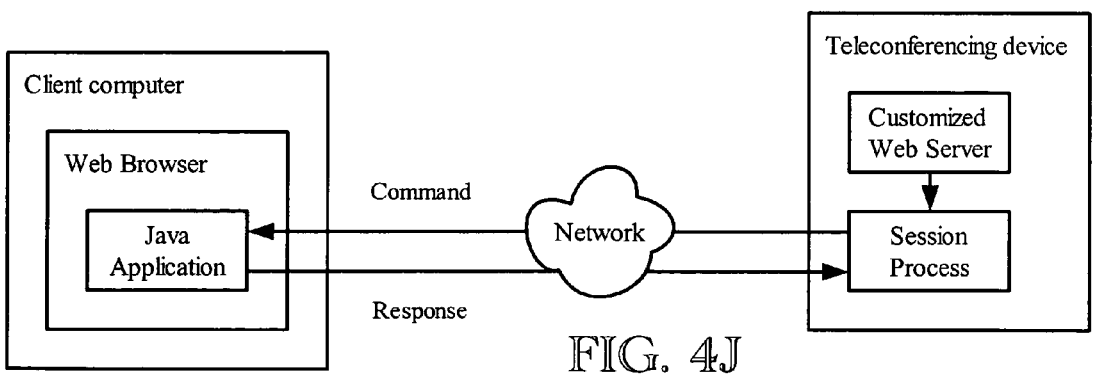

Referring now to FIG. 4G, the session process 416 sends an initial state for the requested information types to the client executable object 414. After the initial state values are sent, state changes may be sent to the client executable object as they occur, as in FIG. 4H. For sending both initial values and changes, the connection may be kept open so as to avoid the network overhead of initiating a new HTTP connection. Network traffic can be minimized by sending changes only as needed, although a client executable object could poll for state or changes as desired. Referring now to FIG. 4I, the client executable object may be configured to check the status of the connection to the session process 416, for example periodically or if no activity is noted for a given period, and reconnect using the HTTP control sequence above if necessary. Checking the state of the connection may be advantageous, particularly if the system uses an unreliable network such as the Internet.

Now the above illustrated methods are sufficient to support a monitoring of a teleconferencing device. It may also be desired to control the device, for example to control volume changes, enter a telephone number, dial a telephone number, redial a telephone number, enable a teleconference, go on or off hook, or to perform a system check. An exemplary set of commands will be described later in connection with a set of exemplary screen views. A client executable object 414 may be fashioned to send commands to session process 416, which commands might include text commands, visual object identifiers, screen positions or other command identification. Session process 416 receives and processes by interpreting those client-sent commands. After interpretation, session process may perform an action intended to affect the teleconferencing device in appropriate ways. Such an action might be to change a variable, to call a control function, to send an inter-process message, or other action depending on the architecture of the teleconferencing device 404. Commands might also be defined and transferred for the reading of informational types not specified for change tracking.

When it is desired to terminate the monitoring and/or control of the teleconferencing device, a user may click on a "close" button or other interface object. In that event, a "close" command may be sent to the session process, indicating that it should close the connection and terminate. A user might also discontinue the client executable object, by closing a browser window or by navigating to a different page. A session process may, if errors are detected, close the connection to the client executable object and terminate. On a network error a connection may thereby be inadvertently closed. That circumstance is recoverable by the client executable object re-accessing the web server 406 with the proper control sequence, thus re-establishing the connection.

Figure 5:
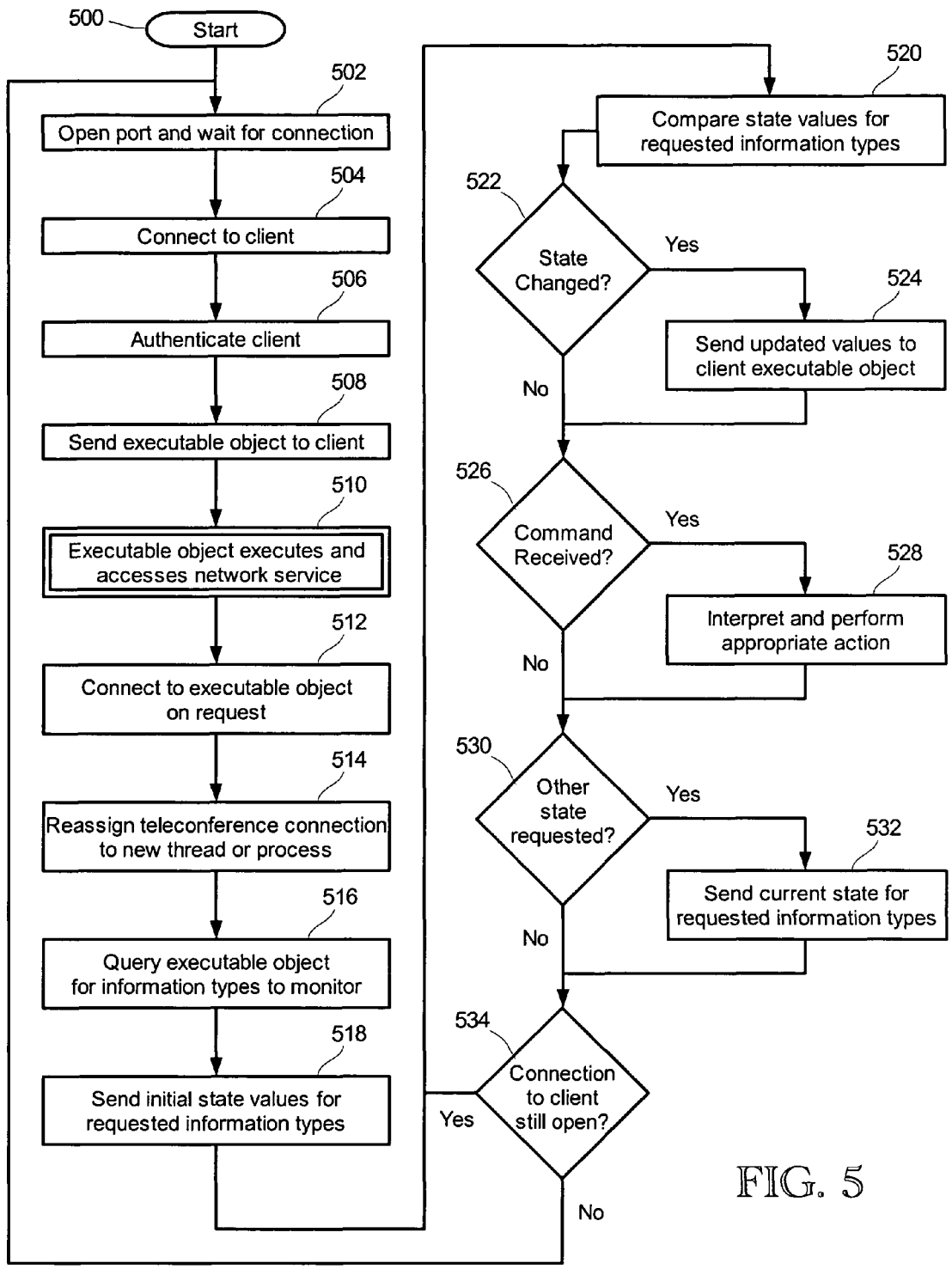
FIG. 5 depicts a process of operating a teleconferencing device through a network service.

Referring now to FIG. 5, a process of operating a teleconferencing device through a network service is described. The first step 502 is to open a port to receive connections. This step is typically performed by a network service, such as an HTTP or web server. A network service may be started at boot, be enabled by a user during operation, or started at another time as desired. Execution halts at step 502 pending a client request to connect. When that is received, a connection is made to the client in step 504. Optionally, the service may authenticate the client in step 506. The exemplary process of FIG. 5 does not require that the client maintain a teleconference device specific program, apart from a commonly included web browser of no particular vendor. An object executable by the client is sent in step 508, that executable object containing instructions for interacting with the network service in relation to various functions and informational objects specific to the teleconferencing device. Step 510 is executed by the client, starting the executable object and thereby accessing the network service. When the network service access attempt occurs, the network service connects to the executable object as in step 512.

The exemplary method of FIG. 5 maintains an open connection to the client executable object. To that end, the teleconference connection made in step 512 is reassigned to a new thread or process in step 514. After reassignment, the network service may be free to accept other connections, which may permit the connection of several clients and client executable objects to the teleconferencing device through the network service. The network service, by the new thread or process, may then query the executable object for information types to monitor and send changed states, as by step 516. Further actions by the network service to the connected client executable object may be continued through the new thread or process.

Upon reply by the client executable object, the service submits the initial state values for information types requested by the client executable object, in step 518. Now a client executable object may require a different set of information types, for example if the user reconfigures the object or if the informational views thereof are modified. In that event, the network service may receive a command specifying a new set of informational types or a new query, which steps are not shown.

After an initial transmission of state values to the client executable object, a loop is entered monitoring for changes to that selected state. In step 520 a comparison is made for the set of informational types for changes to state. Step 522 considers whether any state has changed in the requested set. If yes, step 524 sends any updated values in the set to the client executable object. The method of FIG. 5 also includes provisions for commands. If the client executable object submits a command to the network service, that is detected in step 526. On receipt of a command, step 528 interprets the command and performs any appropriate action. A client executable object may also request state other than that being monitored. Step 530 considers whether such a single request for state has been received, which is responded to in step 532 in the sending of the current state requested.

Periodically, or at other specified times, the network service may determine whether the connection to the client remains open or free of error, as in step 534. If the connection remains open and error free, the loop may repeat. If the loop closes, the teleconferencing thread or process may terminate, and the network service may wait for a new connection from a client.

To simplify explanation, the method of FIG. 5 is depicted as a serial method. It should be recognized that the steps depicted in FIG. 5 may be varied and might be performed in orders differing from the figure. For example, a method similar to that of FIG. 5 might perform checks 522, 526, 530 and 534 in parallel, or through the use of interrupts. In another example, steps 502 through 514 may be conducted repeatedly, in series or in parallel, resulting in several teleconferencing threads or processes, perhaps connecting to several clients. In another example, a digital signal processor (DSP) is used to operate teleconferencing functions, such as the maintenance of gain levels, the reception of keypresses on the teleconferencing device itself, and other functions. In that case, the DSP may trigger or interrupt the network service, for example an input level change, a local interface button press, or a change from one of a number of connected clients. In that example iterations through a loop may be unnecessary by the network service. Other modifications may be performed as desired without departing from the scope of the inventive concepts.

Figure 6A:
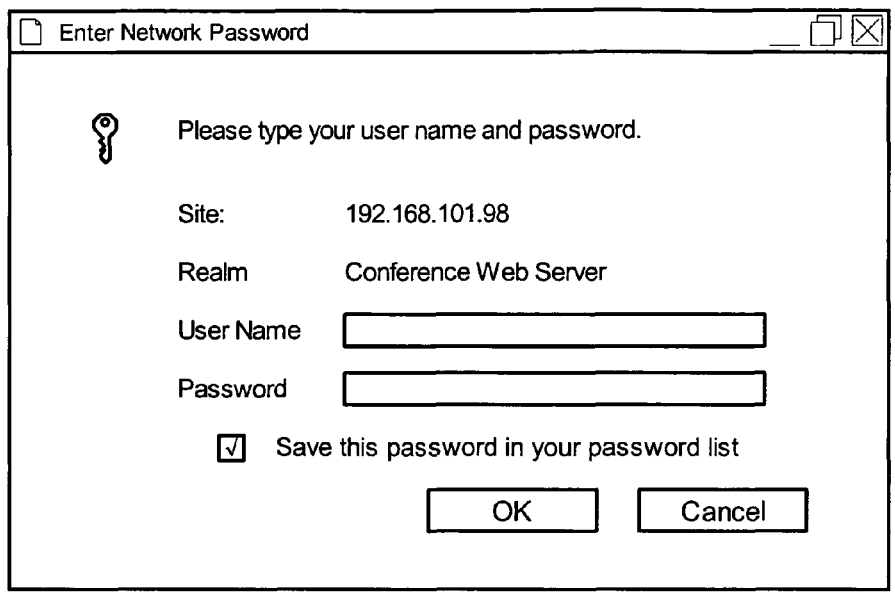
FIGS. 6A-6D depict visual screen representations communicated by way of a network service of an exemplary teleconferencing system.

The remaining discussion of exemplary systems discloses a client executable object that produces visual screen representations as depicted in FIGS. 6A through 6D. FIG. 6A depicts a logon screen useful to authenticate a user to a teleconferencing system network service, which might be used in the authentication steps depicted in FIG. 4B and in step 506 of FIG. 5. FIG. 6A might be the authentication screen rendered by a browser, if a standard HTTP authentication method is used.

Figure 6B:
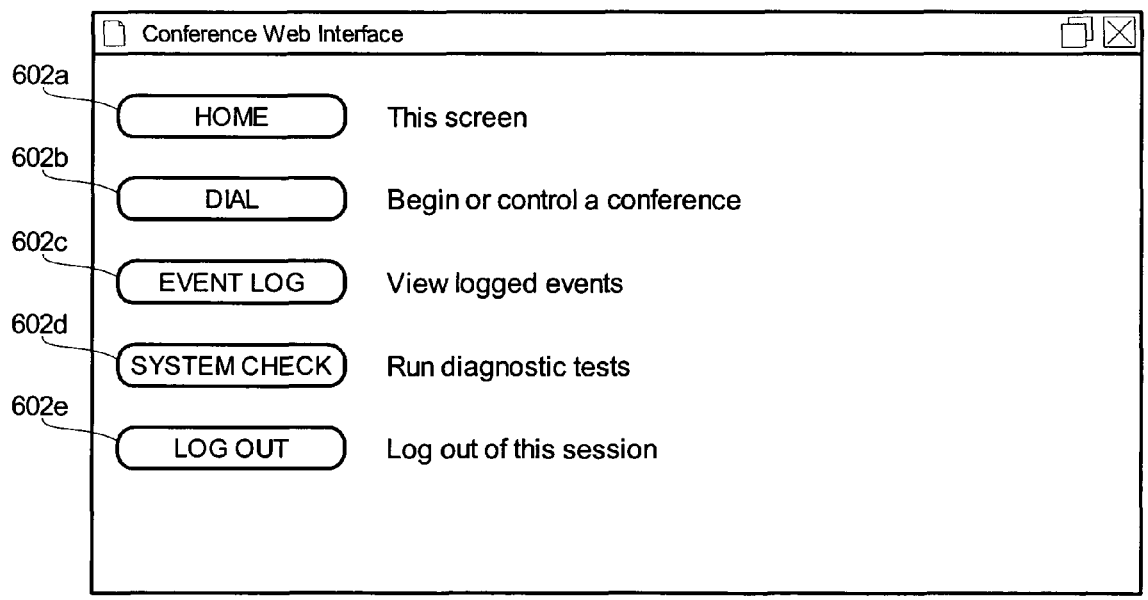

FIG. 6B shows a home screen for an accessible teleconferencing network service, rendered in a browser. The example includes selectable button objects 602a through 602e, providing control over several views provided by the network service. A dial screen, depicted in FIG. 6C, includes a number of visible or selectable objects which will now be described.

Figure 6C:
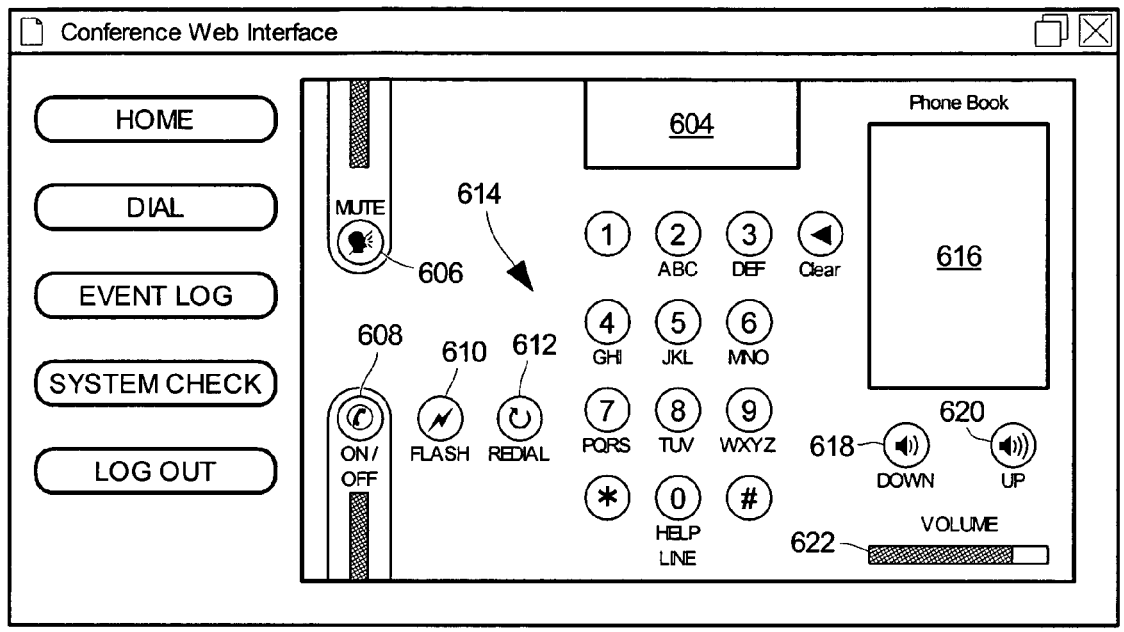

The screen of FIG. 6C includes a number of selectable objects, including a mute button 606, an on/off hook button 608, a flash button 610, a redial button 612, number keys 614, a down volume button 618 and an up volume button 620. Buttons 606 and 608 control binary state functions, and may be displayed in alternating colors reflecting particular states. A text field 604 is displayed representing the display of a physical conferencing device or telephone, and may display telephone numbers, alphanumeric information or other content. A phone book 616 displays entries of names and telephone numbers or other addressable locations. Entries in phone book 616 may be made selectable, indicating the user's desire to perform an action with the entry, for example dialing a telephone number or selecting an entry for modification or deletion. A volume meter 622 displays a volume setting for the teleconference device, which may control the volume of the sound produced at a speaker to conferees. Alternately, a volume or gain control may be provided controlling the sound levels produced to an audio channel from connected microphones.

In the screen of FIG. 6C several objects may display state of several informational types. The color of mute button 606 may indicate whether the sound entering connected microphones are being transferred to an audio channel. Likewise, the color of button 608 may indicate whether the monitored teleconference device is on or off hook. Volume meter 622 may reflect a volume setting. Display 604 may reflect the numbers dialed since placing the teleconference device on-hook. Phone book 616 may reflect an extended informational type including a number of entries in the memory of a connected teleconference device.

As a connected teleconference device is operated, the state of the informational types corresponding to the displayed objects of the screen of FIG. 6C may change. For example, a person physically present at the teleconference device may press an on/off hook button thereon. Likewise, the mute state, volume and number dialed may change by user action at a location other than screen 6C. Phone book entries 616 may also be changed by a user at a remote location or console. As changes to state occur, those state changes may be pushed to the client executable object controlling a screen, thereby updating the display to reflect current state values. All of the buttons shown in FIG. 6C are selectable, some selections resulting in a command to a connected teleconference device to take an action appropriate to a selected button. Following execution of that action, state changes may be forwarded to the client screen as described above.

Figure 6D:
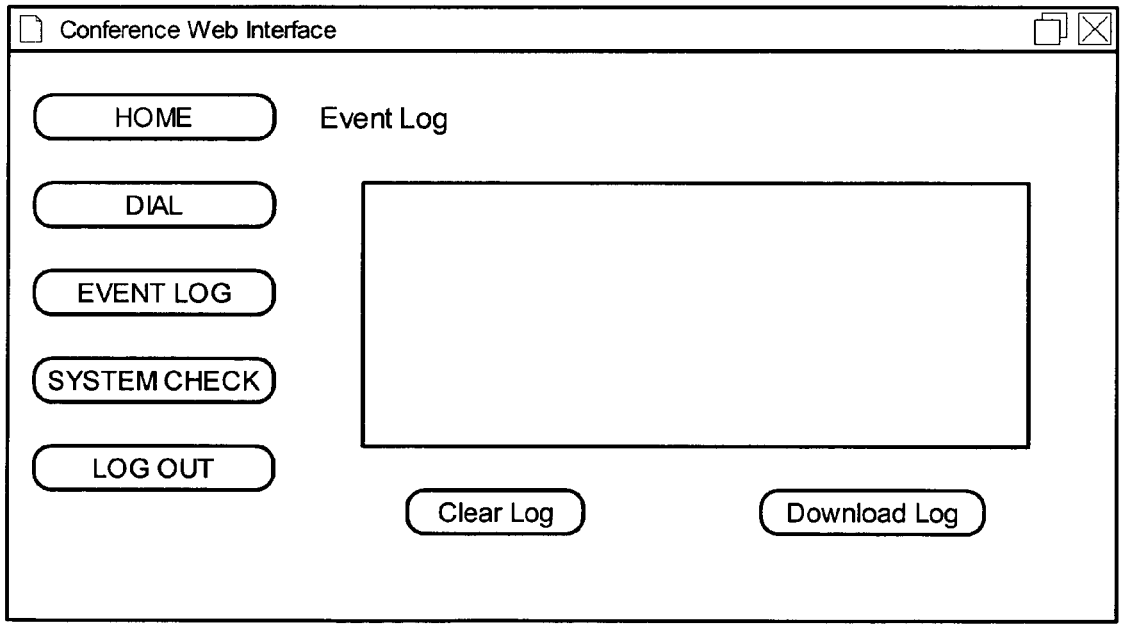

Shown in FIG. 6D is an event log screen, permitting a user remote to a teleconferencing device to review an event log. The event log may be configured to be an informational type, and updated as state changes occur. Not shown is a system check screen, and a log out screen, which provide an interface having the expected functionality.

As user selects buttons 602a through 602e, several of the screens depicted and described may appear. As a new screen is selected, a client executable object may request a new set of informational types. For example, a user may press the "event log" button 602c, resulting in the screen of FIG. 6D appearing. In that event, the set of information types requested to be updated includes only the event log. Likewise, a user selecting the "dial" button 602b will cause the screen of 6C to appear and the informational types of mute, on/off hook, number dialed, volume and phone book to be included in the requested set. Other sets of informational types may be used and requested in accordance with the objects being displayed at any time.

While teleconferencing devices having remote access monitoring and control functions have been described and illustrated in conjunction with a number of specific configurations and methods, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

What is claimed:

1. A teleconferencing system having a network interface including facilities for providing connections to client computing devices, comprising:
   a processor;
   at least one audio input device;
   at least one audio output device;
   network facilities providing network communication between said processor and network devices;
   facilities for connecting to and communicating over a bi-directional audio channel, said facilities providing for transmission of audio signals through the audio channel received at said audio input devices, said facilities further providing for audible sound production at said audio output devices for signals received from the audio channel;
   at least one storage device; and
   computer executable instructions stored to said storage devices, said instructions executable by said processor and by through said network facilities to perform the functions of:
   (i) operating a network service;
   (ii) receiving requests from client computing devices for a connection to the teleconferencing system through the network service;
   (iii) providing to a client computing device a client executable object, the client executable object executable by the client computing device to access teleconferencing functions through the network service of the teleconferencing system;
   (iv) connecting to provided client executable objects through the network service;
   (v) receiving from a connected client executable object a set of information types selected from a group of information types available on the teleconferencing system to be monitored;
   (vi) providing to a connected client executable object the state of a selected set of information types;
   (vii) repeatedly providing to a connected client executable object changes to the state of a monitored set of information types;
   (viii) through said network facilities, receiving control commands generated from a connected client executable object for directing control of the teleconferencing system;
   (ix) interpreting received control commands received from the connected client executable object; and
   (x) performing actions to the teleconferencing system in accordance with interpreted control commands.

2. The teleconferencing system according to claim 1, wherein said interpreting interprets commands selected from the group consisting of volume changes, entering a telephone number, dialing a telephone number, redialing a telephone number, enabling a teleconference, going on hook, going off hook, and performing a system check.

3. The teleconferencing system according to claim 1, wherein said computer executable instructions are executable by said processor to provide to a connected client executable object that changes to the state of a selected set of information types over a persistent connection.

4. The teleconferencing system according to claim 1, wherein said instructions are further executable to perform the function of providing, on request by a connected client executable object, the current state of an information type not included in a monitored selected set of information types.

5. The teleconferencing system according to claim 1, wherein the provided client executable object is a multi-platform object.

6. A teleconferencing system having a network interface including facilities for providing connections to client computing devices, comprising:
   a processor;
   at least one audio input device;
   at least one audio output device;
   network facilities providing network communication between said processor and network devices;
   facilities for connecting to and communicating over a bi-directional audio channel, said facilities providing for transmission of audio signals received at said audio input devices, said facilities further providing for audible sound production at said audio output devices for signals received from the audio channel;
   at least one storage device; and
   computer executable instructions stored to said storage devices, said instructions executable by said processor and by threw said network facilities to perform the functions of:
   (i) operating an HTTP network service;
   (ii) receiving requests through the HTTP service from HTTP browsers operating on client computing devices for a connection to the teleconferencing system;
   (iii) providing to a client computing device a client executable object, the client executable object being executable to access the network service of the teleconferencing system;
   (iv) receiving through the HTTP service a request to connect, the request to connect identifying a connection from the client executable object to an HTTP teleconferencing service;
   (v) upon receiving a request to an HTTP teleconferencing service, creating a teleconferencing connection to the client executable object;
   (vi) reassigning a teleconferencing connection to a teleconferencing communications service;
   (vii) receiving through the teleconferencing communications service by way of a teleconferencing connection a set of information types to be monitored, the set of information types selected from a group of information types available on the teleconferencing system;
   (viii) providing to a client executable object connected by a teleconferencing connection the state of a selected set of information types; and
   (ix) providing to a client executable object connected by a teleconferencing connection changes to the state of a monitored set of information types;
   (x) receiving commands generated from a connected client executable object for directing control of the teleconferencing system;
   (xi) interpreting commands received from the connected client executable object; and
   (xii) performing actions to the teleconferencing system in accordance with interpreted commands.

7. The teleconferencing system according to claim 6, wherein said interpreting interprets commands selected from the group consisting of volume changes, entering a telephone number, dialing a telephone number, redialing a telephone number, enabling a teleconference, going on hook, going off hook, and performing a system check.

8. The teleconferencing system according to claim 6, wherein said computer executable instructions are executable by said processor to provide to a connected client executable object that changes to the state of a selected set of information types over a persistent connection.

9. The teleconferencing system according to claim 6, wherein said instructions are further executable to perform the function of providing, on request by a connected client executable object, the current state of an information type not included in a monitored selected set of information types.

10. The teleconferencing system according to claim 6, wherein the provided client executable object is a multi-platform object.

11. A method of providing network access from a teleconferencing system to an HTTP browser, comprising the steps of:
   operating an HTTP network service;
   receiving requests though the HTTP service from HTTP browsers operating on client computing devices for a connection to the teleconferencing system;
   providing to a client computing device a client executable object, the client executable object executable to access the network service of the teleconferencing system;
   receiving through the HTTP service a request to connect, the request to connect identifying a connection from the client executable object to an HTTP teleconferencing service;
   upon receiving a request to an HTTP teleconferencing service, creating a teleconferencing connection to the client executable object;
   reassigning a teleconferencing connection to a teleconferencing communications service;
   receiving through the teleconferencing communications service by way of a teleconferencing
   connection a set of information types selected from a group of information types available on the teleconferencing system to be monitored;
   providing to a client executable object connected by a teleconferencing connection the state of a selected set of information types; and providing to a client executable object connected by a teleconferencing connection changes to the state of a monitored set of information types;
   receiving commands generated from a connected client executable object for directing control of the teleconferencing system;
   interpreting commands received from the connected client executable object; and
   performing actions to the teleconferencing system in accordance with interpreted commands.

12. The method according to claim 11, wherein said interpreting interprets commands selected from the group consisting of volume changes, entering a telephone number, dialing a telephone number, redialing a telephone number, enabling a teleconference, going on hook, going off hook, and performing a system check.

13. The method according to claim 11, wherein connections to provided client executable objects is persistent, and wherein repeated steps of providing to a connected client executable object that changes to the state of a selected set of information types is performed over a persistent connection.

14. The method according to claim 11, further comprising the step of providing, on request by a connected client executable object, the current state of an information type not included in a monitored selected set of information types.

15. The teleconferencing system according to claim 11, wherein the provided client executable object is a multi-platform object.

* * * * *

UNITED STATES PATENT AND TRADEMARK OFFICE
CERTIFICATE OF CORRECTION

PATENT NO. : 8,069,206 B2  
APPLICATION NO. : 11/083827  
DATED : November 29, 2011  
INVENTOR(S) : Rex E. McDonald, Jr.

Page 1 of 1

It is certified that error appears in the above-identified patent and that said Letters Patent is hereby corrected as shown below:

In column 2, line 27, delete "maybe" and insert -- may be --, therefor.

In column 3, line 36, delete "maybe" and insert -- may be --, therefor.

In column 11, line 21, delete "threw" and insert -- through --, therefor.

In column 12, line 15, in claim 11, delete "though" and insert -- through --, therefor.

In column 12, line 30, in claim 11, after "teleconferencing" insert -- ; --.

In column 12, line 31, in claim 11, delete "connection" and insert -- connecting --, therefor.

Signed and Sealed this  
Seventh Day of February, 2012

David J. Kappos  
*Director of the United States Patent and Trademark Office*